(12) United States Patent
Lee et al.

(10) Patent No.: US 11,317,488 B2
(45) Date of Patent: Apr. 26, 2022

(54) SWITCHING CONTROL CIRCUIT AND LED DRIVING CIRCUIT USING THE SAME

(71) Applicant: MagnaChip Semiconductor, Ltd., Cheongju-si (KR)

(72) Inventors: Jang Hyuck Lee, Gyeonggi-do (KR); Hyun Mo Ahn, Cheongju-si (KR); Byoung Kwon An, Seoul (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 17/227,994

(22) Filed: Apr. 12, 2021

(65) Prior Publication Data

US 2022/0022296 A1    Jan. 20, 2022

(30) Foreign Application Priority Data

Jul. 16, 2020   (KR) .......................... 10-2020-0088231

(51) Int. Cl.
*H05B 45/10*      (2020.01)
*H05B 45/325*    (2020.01)
*H05B 45/375*    (2020.01)
*H05B 47/16*     (2020.01)

(52) U.S. Cl.
CPC ........... *H05B 45/325* (2020.01); *H05B 45/10* (2020.01); *H05B 45/375* (2020.01); *H05B 47/16* (2020.01)

(58) Field of Classification Search
CPC ........ H05B 45/00; H05B 45/10; H05B 45/32; H05B 45/325; H05B 45/375; H05B 47/10; H05B 47/16
See application file for complete search history.

(56) References Cited

U.S. PATENT DOCUMENTS 9,502,975 B2    11/2016  Shin et al.
2021/0100082 A1*  4/2021  Aoki ..................... H05B 45/375

\* cited by examiner

*Primary Examiner* — Jimmy T Vu
(74) *Attorney, Agent, or Firm* — NSIP Law

(57) ABSTRACT

A switching control circuit configured to turn on a driving switching element by providing a gate signal to the driving switching element connected in series to an LED includes the switching control circuit configured to divide a PWM dimming signal into a normal PWM dimming section and a low PWM dimming section based on a timing selection signal, provide the gate signal of a first frequency to the driving switching element in the normal PWM dimming section, and provide the gate signal of a second frequency, greater than the first frequency, in the low PWM dimming section.

24 Claims, 12 Drawing Sheets

SWITCHING CONTROL CIRCUIT AND LED DRIVING CIRCUIT USING THE SAME

CROSS-REFERENCE TO RELATED APPLICATION

This application claims the benefit under 35 USC 119(a) of Korean Patent Applications No. 10-2020-0088231, filed Jul. 16, 2020, the entire disclosure of which is incorporated herein by reference for all purposes.

BACKGROUND

The present disclosure relates to a switching control circuit and an LED driving circuit using the same.

A light-emitting diode (LED) device is capable of excellent color reproduction and miniaturization and is used in various lighting devices. Particularly, the LED device is also used as a backlight source of a liquid crystal display (LCD).

When the LED device is intended to be used as the LCD backlight, there is a desire for pulse width modulation (PWM) driving caused by a DC-DC converter that controls a voltage level and inputs to the LED. The brightness of the LED device may be controlled by controlling a duty ratio of the PWM driving. That is, the average value of a current flowing through the LED device by the turn-on and turn-off operation of a switching transistor included within the DC-DC converter is related to the brightness of the LED device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a switching control circuit configured to turn on a driving switching element by providing a gate signal to the driving switching element connected in series to an LED includes the switching control circuit configured to divide a PWM dimming signal into a normal PWM dimming section and a low PWM dimming section based on a timing selection signal, provide the gate signal of a first frequency to the driving switching element in the normal PWM dimming section, and provide the gate signal of a second frequency, greater than the first frequency, in the low PWM dimming section.

The switching control circuit may further include: an off-time controller which receives the timing selection signal, determines a length of the low PWM dimming section in accordance with a voltage level of the timing selection signal, selects and outputs a control signal of the second frequency during the low PWM dimming section, and selects and outputs a control signal of the first frequency in the normal PWM dimming section; and a switch driving unit which generates the gate signal from the selected result.

The off-time controller may include an off-time setting unit which compares a capacitor voltage charged by a start of the low PWM dimming section with a voltage level of the timing selection signal, and outputs a control selection signal; and a selection switch which selects and outputs any one of the control signal of the first frequency and the control signal of the second frequency in accordance with the control selection signal.

The off-time setting unit may be further configured to output the control selection signal with a low level when the capacitor voltage is less than the voltage level of the timing selection signal, and may output the control selection signal with a high level when the capacitor voltage is equal to or higher than the voltage level of the timing selection signal. The selection switch may be further configured to output the control signal of the second frequency by the control selection signal with a low level, and may output the control signal of the first frequency by the control selection signal with a high level.

The off-time controller may include an off-time setting unit which compares a result value obtained by counting clocks in the low PWM dimming section with the voltage level of the timing selection signal, and outputs the control selection signal; and a selection switch which selects and outputs any one of the control signals of the first frequency and the second frequency in accordance with the control selection signal.

The off-time setting unit may be further configured to output the control selection signal with a low level when the result value obtained by counting clocks is less than the voltage level of the timing selection signal, and may output the control selection signal with a high level when the result value obtained by counting clocks is equal to or greater than the voltage level of the timing selection signal. The selection switch may be further configured to output the control signal of the second frequency by the control selection signal with a low level, and may output the control signal of the first frequency by the control selection signal with a high level.

The off-time controller may include an off-time converter which receives the control signal of the second frequency in a frequency conversion section between the low PWM dimming section and the normal PWM dimming section and outputs a control signal of a third frequency greater than the first frequency and less than the second frequency; and a selection switch which selects and outputs the control signal of the third frequency in the frequency conversion section.

The off-time converter may be further configured to output the control signal of the third frequency such that the frequency is decreased with the lapse of time in the frequency conversion section.

The selection switch may further include a comparator which outputs a switching change signal when the third frequency is equal to or less than the first frequency. The selection switch may be further configured to select and output the control signal of the first frequency in accordance with the switching change signal.

The switching control circuit may further include a comparison unit which compares a source terminal voltage of the driving switching element with a reference voltage. The switch driving unit may be composed of an SR latch.

In another general aspect, an LED driving circuit includes a buck converter and a switching control circuit. The buck converter includes a driving switching element connected in series to an LED module and the switching control circuit provides a gate signal to the driving switching element. The switching control circuit divides a PWM dimming signal into a normal PWM dimming section and a low PWM dimming section on the basis of a timing selection signal, provides a gate signal of a first frequency to the driving switching element in the normal PWM dimming section, and provides a gate signal of a second frequency greater than the first frequency in the low PWM dimming section.

The buck converter may further include: a capacitor connected in parallel to the LED module; an inductor connected in series to the LED module; a diode which supplies energy released from the inductor to the LED module; and a source resistor which senses a source terminal voltage of the driving switching element.

The LED driving circuit may further include an off-time controller configured to receive the timing selection signal, determine a length of the low PWM dimming section in accordance with a voltage level of the timing selection signal, select and output a control signal of the second frequency during the low PWM dimming section, and select and output a control signal of the first frequency in the normal PWM dimming section; and a switch driving unit configured to generate the gate signal from the selected result.

The off-time controller may include an off-time setting unit configured to compare a capacitor voltage, charged by a start of the low PWM dimming section, with a voltage level of the timing selection signal, and output a control selection signal; and a selection switch configured to select and output any one of the control signal of the first frequency and the control signal of the second frequency in accordance with the control selection signal.

The off-time setting unit may be further configured to output the control selection signal with a low level when the capacitor voltage is less than the voltage level of the timing selection signal, and output the control selection signal with a high level when the capacitor voltage is higher than the voltage level of the timing selection signal. The selection switch may be further configured to output the control signal of the second frequency by the control selection signal with a low level, and output the control signal of the first frequency by the control selection signal with a high level.

The off-time controller may include an off-time setting unit configured to compare a result value obtained by counting clocks in the low PWM dimming section with the voltage level of the timing selection signal, and output a control selection signal; and a selection switch configured to select and output any one of the control signal of the first frequency and the control signal of the second frequency in accordance with the control selection signal.

The off-time setting unit may be further configured to output the control selection signal with a low level when the result value obtained by counting clocks is less than the voltage level of the timing selection signal, and output the control selection signal with a high level when the result value obtained by counting clocks is greater than the voltage level of the timing selection signal. The selection switch may be further configured to output the control signal of the second frequency by the control selection signal with a low level, and output the control signal of the first frequency by the control selection signal with a high level.

The off-time controller may include an off-time converter configured to receive the control signal of the second frequency in a frequency conversion section between the low PWM dimming section and the normal PWM dimming section, and output a control signal of a third frequency greater than the first frequency and less than the second frequency; and a selection switch configured to select and output the control signal of the third frequency in the frequency conversion section.

The off-time converter may be further configured to output the control signal of the third frequency such that the third frequency is decreased over time in the frequency conversion section.

The selection switch may further include a comparator configured to output a switching change signal when the third frequency is equal to or less than the first frequency. The selection switch may be further configured to select and output the control signal of the first frequency in accordance with the switching change signal.

In another general aspect, a switching control circuit includes an off-time controller and a switch driving unit. The off-time controller is configured to receive a timing selection signal, determine a length of a low PWM dimming section of a PWM dimming signal in accordance with a voltage level of the timing selection signal, select and output a control signal of a first frequency in a normal PWM dimming section of the PWM dimming signal, and select and output a control signal of a second frequency, greater than the first frequency, during the low PWM dimming section. The switch driving unit is configured to generate a gate signal from the selected result to a driving switching element connected in series to an LED.

The off-time controller may include an off-time setting unit configured to compare a capacitor voltage, charged by a start of the low PWM dimming section, with a voltage level of the timing selection signal, and output a control selection signal, and a selection switch configured to select and output any one of the control signal of the first frequency and the control signal of the second frequency in accordance with the control selection signal.

The off-time setting unit may be further configured to output the control selection signal with a low level when the capacitor voltage is less than the voltage level of the timing selection signal, and output the control selection signal with a high level when the capacitor voltage is higher than the voltage level of the timing selection signal. The selection switch may be further configured to output the control signal of the second frequency by the control selection signal with a low level, or output the control signal of the first frequency by the control selection signal with a high level.

The off-time controller may include an off-time setting unit configured to compare a result value obtained by counting clocks in the low PWM dimming section with the voltage level of the timing selection signal, and output a control selection signal, and a selection switch configured to select and output any one of the control signal of the first frequency and the control signal of the second frequency in accordance with the control selection signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
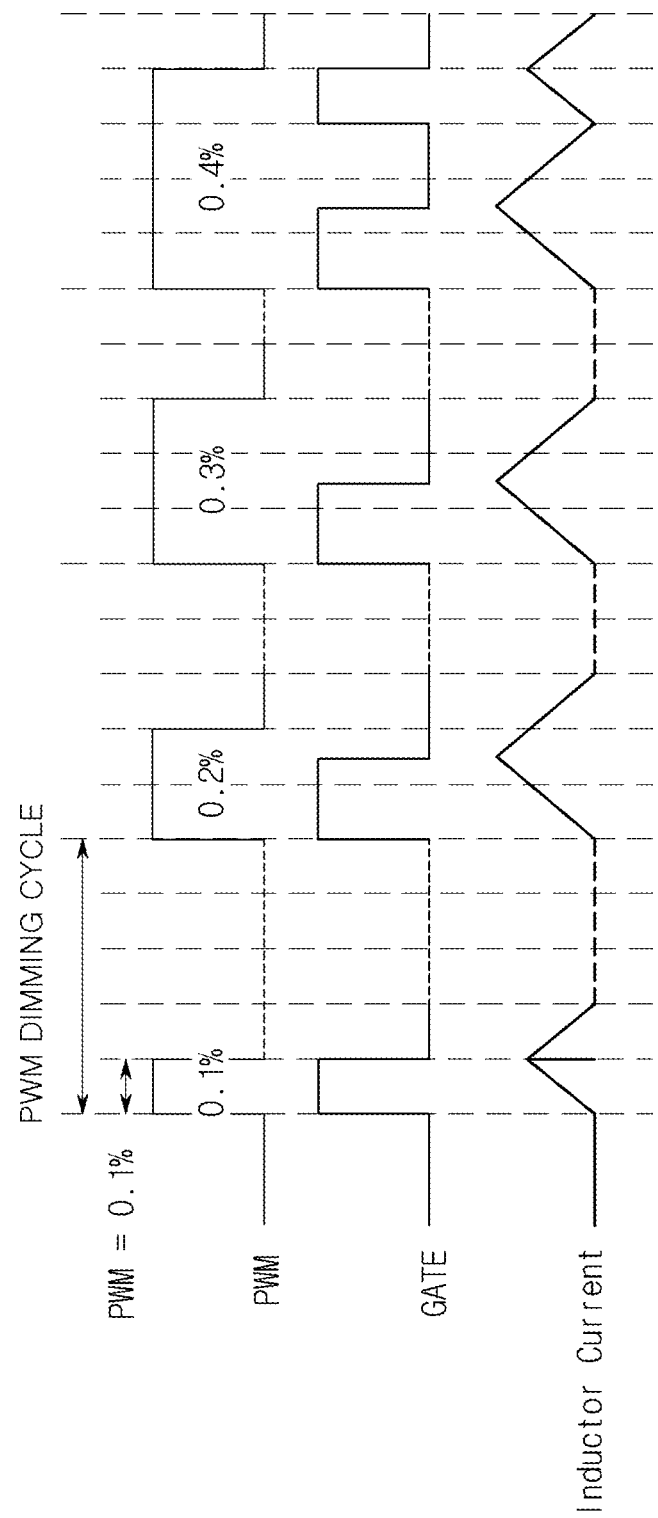
FIGS. 1 and 2 are timing diagrams describing the operation of an LED device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

The purpose of the present disclosure is to provide a switching control circuit that turns on a driving switching element connected to an LED device and can convert switching frequencies of a low PWM dimming section and a normal PWM dimming section.

The purpose of the present disclosure is to provide an LED driving circuit, including the switching control circuit capable of converting switching frequencies of the low PWM dimming section and the normal PWM dimming section.

A switching control circuit and an LED control device according to examples of the present disclosure divide a normal PWM dimming section and a low PWM dimming section, and switch to a frequency sufficiently greater than a PWM dimming frequency in a section requiring low PWM dimming, so that the linearity of an LED current can be obtained.

Also, the LED control device is switched to a second frequency in the low PWM dimming section and is switched to a first frequency less than the second frequency in the remaining normal PWM dimming section. Through this, power consumption and heat generation of a driving switching element can be reduced in a section which does not require low PWM dimming.

Figure 2:
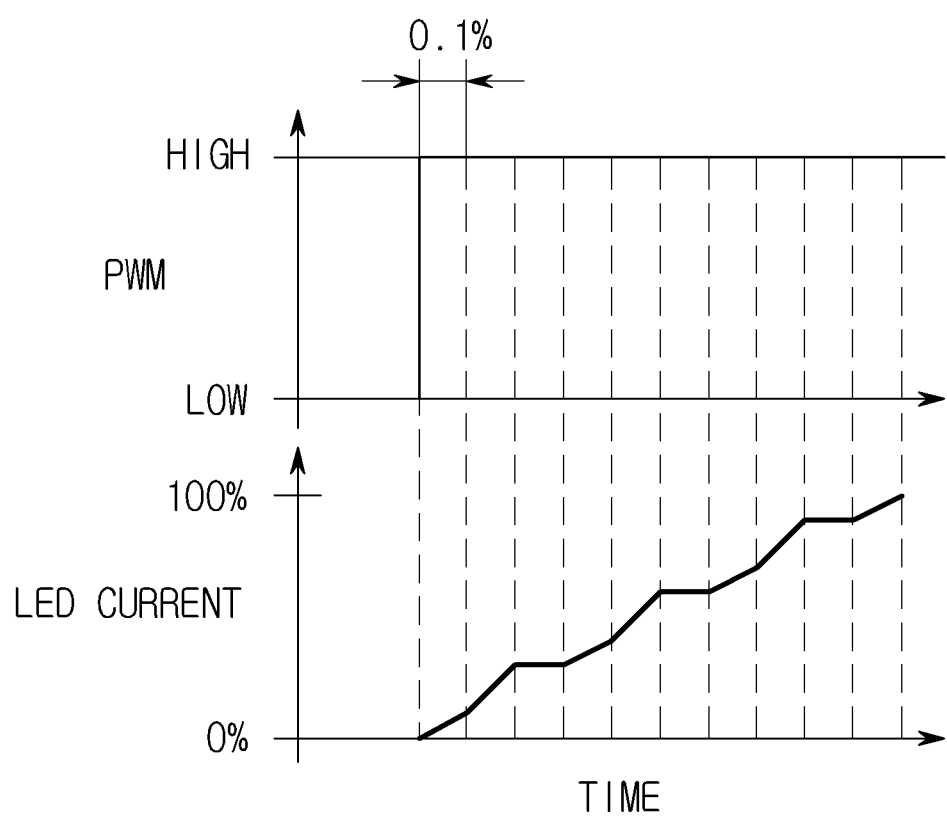

FIGS. 1 and 2 are timing diagrams describing the driving of the LED device. In the shown timing diagrams, a PWM signal is a timing at which PWM dimming occurs for the PWM driving. A gate signal is provided to a gate of the switching transistor and turns on the switching transistor. An inductor current is the magnitude of a current flowing through an inductor, connected in series to the LED device, by the switching transistor's turn-on operation.

In order to drive the LED device with the minimized brightness, there may be a desire for an operational method allowing the LED device to operate in the duty ratio equal to or less than 5%; in other words, there may be a desire for low PWM dimming driving. A delay may occur until the current flowing through the LED device increases to a target value when the PWM driving occurs. Such a delay may generate an error in the average current control of the above-described LED device.

FIG. 1 shows that the PWM dimming operates in 0.1%, 0.2%, 0.3%, and 0.4% of the PWM dimming cycle, and the switching frequency of the switching transistor operates 333 times as much as the PWM dimming frequency. The PWM duty ratio operates twice, three times, and four times as much as 0.1% when the PWM driving occurs. However, it can be seen that, due to the mismatch between the gate signal and the PWM duty cycle, the increment of the inductor current does not match the increment of the PWM duty ratio.

When the increment of the inductor current does not match the increment of the PWM duty ratio, this may cause a problem that, as shown in FIG. 2, the LED current does not increase linearly when the PWM driving occurs. This may lead to a problem that it is difficult to linearly control the LED current according to the duty ratio during the low PWM dimming. Therefore, the switching frequency of the switching transistor when the PWM driving occurs needs to be set to be sufficiently greater than the frequency of the PWM dimming cycle.

Figure 3:
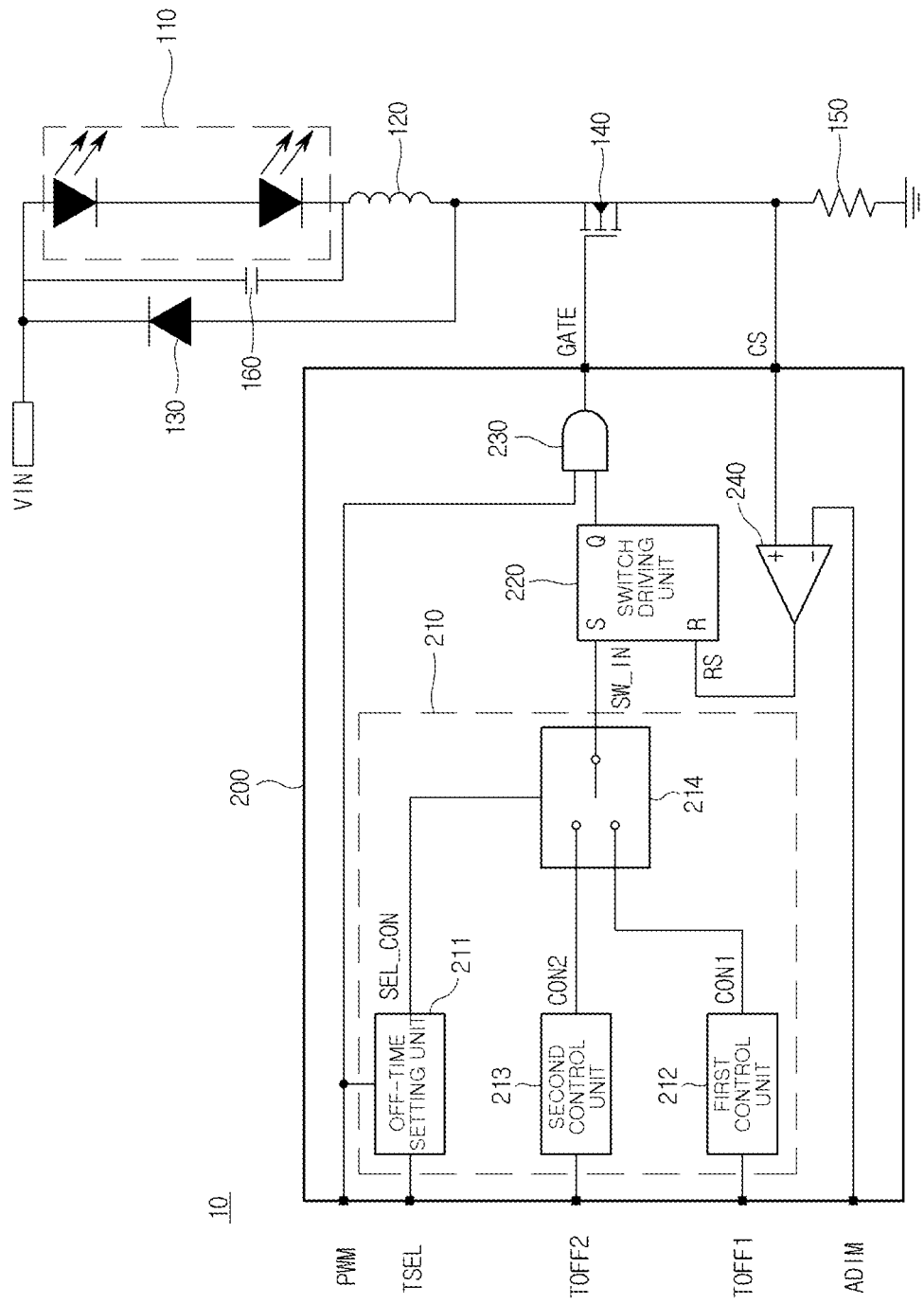
FIG. 3 is an example of an LED driving circuit diagram according to one or more examples of the present disclosure.

FIG. 3 is an LED driving circuit diagram according to one or more embodiments of the present disclosure.

Referring to FIG. 3, an LED driving circuit 10 may include a buck converter and a switching control circuit 200. The buck converter may include an LED module 110, an inductor 120, a diode 130, a driving switching element 140, a source resistor 150, and a capacitor 160.

The LED module 110 may be formed by arranging one or more LEDs in series or parallel, or both. The LED module 110 may be driven by applying an input voltage VIN thereto.

The inductor 120 may be connected in series to the LED module 110. The inductor 120 may store energy supplied through the input voltage VIN or may release the stored energy based on the operation of the driving switching element 140. As the inductance of the inductor 120 changes, the turn-on period of the driving switching element 140 may change based on the change of the inductance of the inductor 120. Therefore, the switching frequency of the driving switching element 140 may be changed accordingly.

When the energy is released from the inductor 120, the diode 130 may form a current moving path capable of providing the energy to the LED module 110. Specifically, when the driving switching element 140 is turned off, the diode 130 may allow the energy stored in the inductor 120 to flow into the LED module 110 and to be consumed.

The driving switching element 140, connected in series to the LED module 110 and the inductor 120, repeatedly performs turn-on and turn-off operations to control the amount of the current flowing through the LED module 110.

Specifically, the driving switching element 140 may be turned on by a gate signal GATE provided from the switching control circuit 200. When the high-level gate signal GATE is applied, the driving switching element 140 is turned on, and current flows through the LED module 110 and the inductor 120 by the input voltage VIN. The current may allow energy to be accumulated in the inductor 120 and flow to the source resistor 150 through the driving switching element 140. The source terminal voltage of the driving switching element 140 may be sensed by the source resistor 150.

Subsequently, when the low-level gate signal GATE is applied, the driving switching element 140 is turned off. A current path is formed so that inductor current from the energy accumulated in the inductor 120 flows through the diode 130 to the LED module 110. The inductor current may be decreased until the driving switching element 140 is turned on. A high level and a low level are repeatedly applied to the gate signal GATE during a PWM dimming cycle, thereby turning on and turning off the driving switching element 140.

The switching control circuit 200 may include an off-time controller 210, a switch driving unit 220, a gate signal output unit 230, and a comparison unit 240.

The off-time controller 210 may generate a switching input signal SW_IN provided to the switch driving unit 220 based on a timing selection signal TSEL provided from the outside. The switching input signal SW_IN may have a first frequency or a second frequency according to the timing selection signal TSEL.

That is, when the LED driving circuit 10 operates in a normal PWM dimming section, the off-time controller 210 may output the switching input signal SW_IN of the first frequency to the switch driving unit 220. When the LED driving circuit 10 operates in a low PWM dimming section, the switching control circuit 200 may output the switching input signal SW_IN of the second frequency to the switch driving unit 220. In one or more embodiments of the present disclosure, the second frequency may be greater than the first frequency.

Also, the second frequency may be sufficiently greater than the frequency of the PWM dimming cycle. For example, the second frequency may be 1,000 times the frequency of the PWM dimming cycle.

The off-time controller 210 may include an off-time setting unit 211, a first control unit 212, a second control unit 213, and a selection switch 214.

The off-time setting unit 211 may be provided with a PWM signal PWM and the timing selection signal TSEL from the outside and may output a control selection signal SEL_CON. The PWM signal PWM may be a signal for distinguishing the PWM dimming section. The PWM signal PWM is a pulse signal having a high level and a low level in a constant cycle, and the brightness of the LED module 110 may be adjusted according to a duty ratio of the PWM signal PWM.

The first control unit 212 and the second control unit 213 may output a first control signal CON1 of the first frequency and a second control signal CON2 of the second frequency, respectively. The first control signal CON1 of the first frequency is for generating the gate signal GATE that drives the driving switching element 140 in the normal PWM dimming section. The second control signal CON2 of the second frequency is for generating the gate signal GATE that drives the driving switching element 140 in the low PWM dimming section.

The first control unit 212 and the second control unit 213 may receive a first off signal TOFF1 and a second off signal TOFF2, respectively, and may generate the first control signal CON1 and the second control signal CON2. In one or more embodiments, the first off signal TOFF1 and the second off signal TOFF2 are the same clock signal. The first control unit 212 and the second control unit 213 may generate the first control signal CON1 and the second control signal CON2 by different division ratios and are not limited thereto. The first off signal TOFF1 and the second off signal TOFF2 have the first frequency and the second frequency, respectively, and the first control unit 212 and the second control unit 213 may function as a buffer.

The selection switch 214 may select one of the first control signal CON1 and the second control signal CON2 based on the control selection signal SEL_CON, and may provide the selected control signal as a switching input signal SW_IN to the switch driving unit 220. Specifically, when the low-level control selection signal SEL_CON is provided to the selection switch 214, the selection switch 214 may provide the second control signal CON2 as a switching input signal SW_IN to the switch driving unit 220. When the high-level control selection signal SEL_CON is provided to the selection switch 214, the selection switch 214 may provide the first control signal CON1 as a switching input signal SW_IN to the switch driving unit 220.

The switch driving unit 220 may perform a NOR or NAND logical operation on a reset signal RS that is the output of the comparison unit 240 and the switching input signal SW_IN that is the output of the off-time controller 210, and may provide them to the gate signal output unit 230.

In one or more embodiments, the switch driving unit 220 may include an SR latch formed using a NOR or NAND logic gate for the switching input signal SW_IN and the reset signal RS. However, the present disclosure is not limited thereto.

For example, when a high-level switching input signal SW_IN is input to a set terminal S of the switch driving unit 220, the switch driving unit 220 may output a high-level signal through an output terminal Q. Then, when the high-level reset signal RS is provided to a reset terminal R, the switch driving unit 220 may output a low-level signal through the output terminal Q.

The comparison unit 240 may receive a voltage of a source terminal CS of the driving switching element 140 and the reference voltage ADIM, and may output the reset signal RS to the switch driving unit 220 based on a comparison result of the voltage of the source terminal CS and the reference voltage ADIM.

The PWM signal PWM may also be provided to the gate signal output unit 230. The gate signal output unit 230 may include, for example, an AND gate which performs an AND operation on a signal output from the switch driving unit 220 and the PWM signal PWM. The gate signal output unit 230 provides the gate signal GATE, which is a result obtained by performing an AND operation on the PWM signal PWM and the output signal of the switch driving unit 220, thereby turning on or off the driving switching element 140.

The switching control circuit 200 may output the gate signal GATE to the driving switching element 140 only when the PWM driving signal PWM and the output signal of the first frequency or the second frequency output from the switch driving unit 220 have a high level at the same time. Accordingly, the driving switching element 140 can operate by being turned on by the gate signal GATE only in a high section of PWM dimming.

As a result, the LED driving circuit 10 of the present disclosure includes the driving switching element 140 that is switched to the first frequency or the second frequency during the PWM dimming section based on the output of the off-time controller 210 controlled by the timing selection signal TSEL that divides a PWM dimming signal into the normal PWM dimming section and the low PWM dimming section. Accordingly, in the LED driving circuit 10, the light emission of the LED module 110 is controlled by the driving switching element 140 that is switched to the first frequency in the normal PWM dimming section, and is controlled by the driving switching element 140 that is switched to the second frequency in the low PWM dimming section.

As described above, in the low PWM dimming section, the driving switching element 140 must be switched to have a sufficiently large frequency compared to the PWM dimming cycle. As described above, the driving switching element 140 may be switched by the second frequency greater than the first frequency in the low PWM dimming section. However, if the driving switching element 140 is switched to the second frequency over the entire PWM dimming section, the normal operation of the driving switching element 140 may not be guaranteed due to heat generated in the driving switching element 140. Therefore, the linearity of the current flowing through the LED module 110 can be guaranteed by driving the driving switching element 140 at the second frequency in the low PWM dimming section, which occupies a portion of the PWM dimming section. The heat generated in the driving switching element 140 can be reduced by driving the driving switching element 140 at the first frequency less than the second frequency in the normal PWM dimming section.

Figure 4:
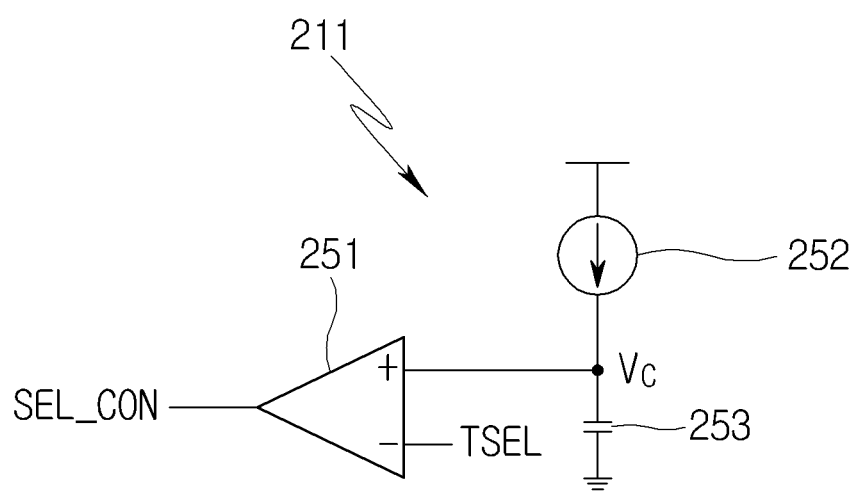
FIG. 4 is a view describing an example of an off-time setting unit.
Figure 5:
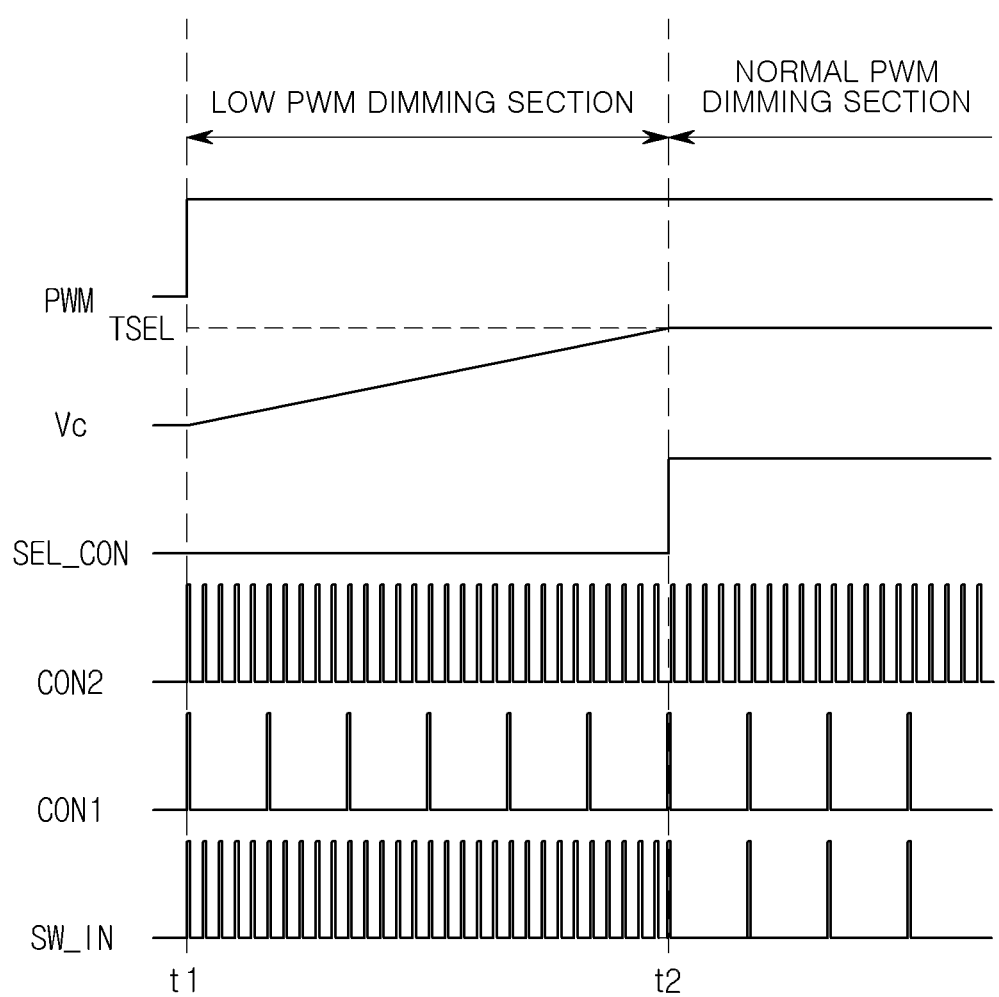
FIG. 5 is a timing diagram describing the operation of the off-time setting unit of FIG. 4.

FIG. 4 is a view describing an example of the off-time setting unit. FIG. 5 is a timing diagram describing the operation of the off-time setting unit of FIG. 4.

Referring to FIG. 4, the off-time setting unit 211 may include a comparator 251, a current source 252, and a capacitor 253.

The comparator 251 may compare the voltage level of the timing selection signal TSEL with a voltage Vc charged in the capacitor 253 by the current flowing from the current source 252. The comparator 251 may output the low-level control selection signal SEL_CON when, for example, the voltage Vc charged in the capacitor is less than the voltage level of the timing selection signal TSEL, and may output the high-level control selection signal SEL_CON when the voltage Vc of the capacitor is greater than the selection signal TSEL.

The current source 252 may be, for example, turned on by the PWM signal PWM and then may provide a current to the capacitor 253.

As shown in FIG. 5, the capacitor 253 is charged by the current at a time point t1, so that the capacitor voltage Vc increases. When the capacitor voltage Vc is greater than the voltage level of the timing selection signal TSEL at a time point t2, the comparator 251 outputs the high-level control selection signal SEL_CON.

That is, the switching control circuit 200 is driven in the low PWM dimming section by switching the driving switching element 140 by the gate signal GATE of the second frequency at the time point t1, and is driven in the normal PWM dimming section by switching the driving switching element 140 by the gate signal GATE of the first frequency at the time point t2.

Accordingly, in the LED driving circuit 10 of the present disclosure, the driving time in the low PWM dimming section and the normal PWM dimming section can be controlled according to the voltage level of the timing selection signal TSEL.

Figure 6:
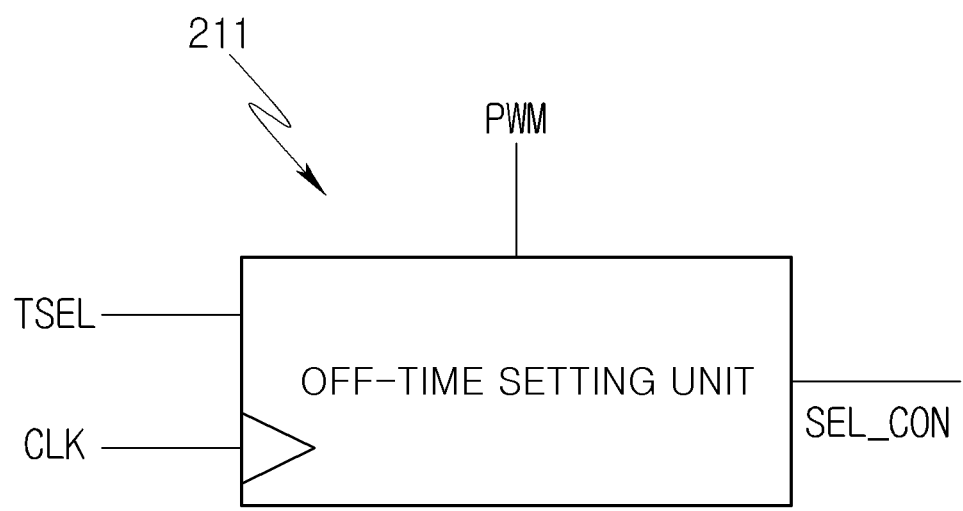
FIG. 6 is a view describing another example of the off-time setting unit.
Figure 7:
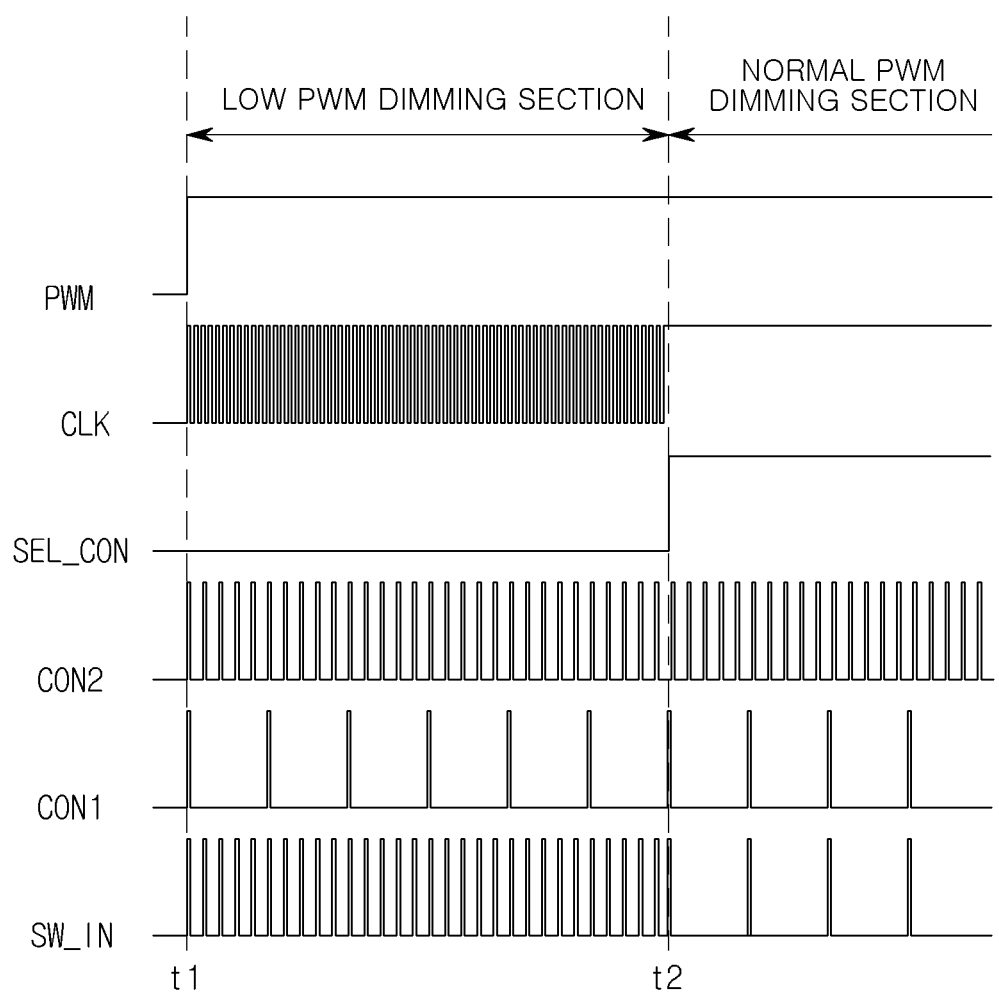
FIG. 7 is a timing diagram describing the operation of the off-time setting unit of FIG. 6.

FIG. 6 is a view describing another example of the off-time setting unit. FIG. 7 is a timing diagram describing the operation of the off-time setting unit of FIG. 6.

Referring to FIGS. 6 and 7, the off-time setting unit 211 may include a counter which receives the PWM signal PWM, the timing selection signal TSEL, and a clock signal CLK and outputs the control selection signal SEL_CON.

The off-time setting unit 211 may count the clock signal CLK when the timing selection signal TSEL is provided at the time point t1. The off-time setting unit 211 may include, for example, a table in which the count number of the clock signals CLK corresponding to the voltage magnitude of the timing selection signal TSEL is matched. The off-time setting unit 211 may output the low-level control selection signal SEL_CON while counting the clock signal CLK during the reception of the timing selection signal TSEL. The selection switch 214 outputs the second control signal CON2 of the second frequency as the switching input signal SW_IN by the low-level control selection signal SEL_CON.

When the count value of the clock signal CLK reaches a predetermined value at the time point t2, the off-time setting unit 211 may stop counting the clock signal CLK and output a high-level control selection signal SEL_CON. The selection switch 214 outputs the first control signal CON1 of the first frequency as the switching input signal SW_IN by the high-level control selection signal SEL_CON.

That is, the switching control circuit 200 is driven in the low PWM dimming section by switching the driving switching element 140 by the gate signal GATE of the second frequency at the time point t1, and is driven in the normal PWM dimming section by switching the driving switching element 140 by the gate signal GATE of the first frequency at the time point t2. Accordingly, in the LED driving circuit 10 of the present disclosure, the driving time in the low PWM dimming section and the normal PWM dimming section can be controlled according to the voltage level of the timing selection signal TSEL.

Figure 8:
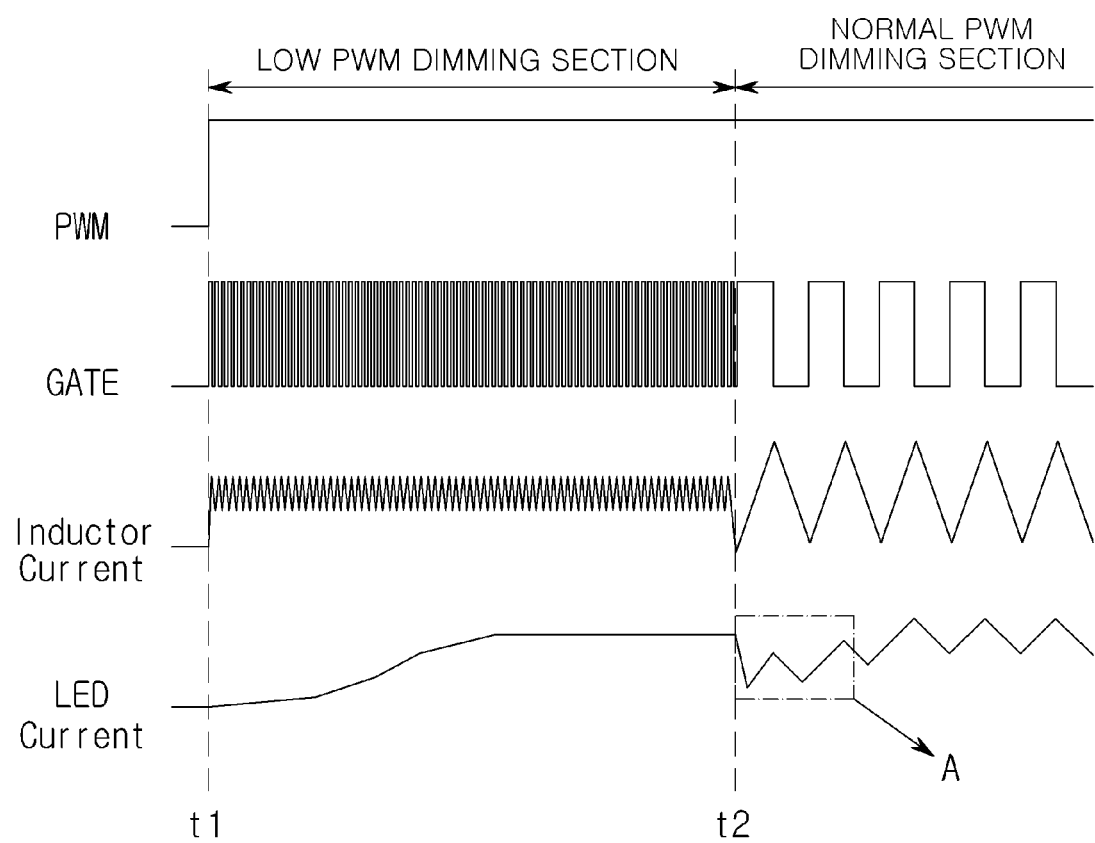
FIG. 8 is a timing diagram describing the operation of an LED driving circuit.

FIG. 8 is a timing diagram describing the operation of an LED driving circuit. The timing diagram of FIG. 8 has the same timing as that of the operation of the LED driving circuit 10 previously described with reference to FIG. 5 or 7.

Referring to FIG. 8, the LED driving circuit 10 operates in the low PWM dimming section at the time point t1 and operates in the normal PWM dimming section at the time point t2. In the low PWM dimming section, the gate signal GATE having the second frequency is provided to the driving switching element 140. In the normal PWM dimming section, the gate signal GATE having the first frequency is provided to the driving switching element 140.

As described above, since the second frequency is set to be sufficiently greater than the frequency of the PWM dimming cycle, the linearity of the LED current can be obtained by turning-on and turning-off of the driving switching element 140 in the low PWM dimming section.

Also, the LED driving circuit 10 is switched to the second frequency in the low PWM dimming section and is switched to the first frequency less than the second frequency in the normal PWM dimming section. Through this, a driving switching element's power consumption and heat generation can be reduced in a section that does not require low PWM dimming.

However, as shown in part "A" of FIG. 8, when the driving switching element 140 that is being switched to the second frequency in the low PWM dimming section is controlled to be switched to the first frequency at the time point t2, an undershoot or overshoot may occur in the current flowing through the LED module 110 due to the difference in operating frequency. A method for solving this problem is described in another embodiment of FIG. 9.

Figure 9:
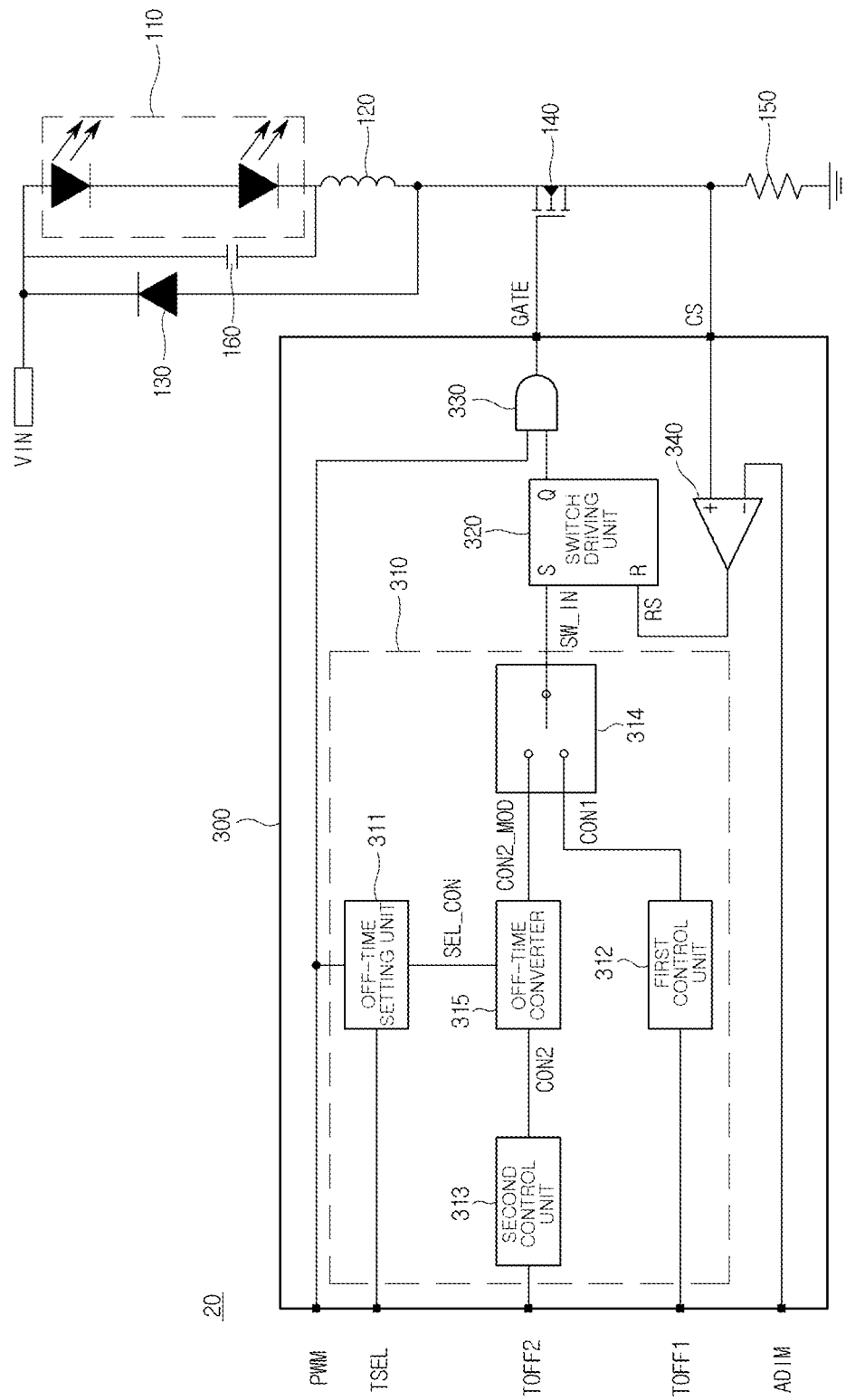
FIG. 9 is an example of an LED driving circuit diagram according to one or more other embodiments of the present disclosure.

FIG. 9 is an LED driving circuit diagram according to one or more other embodiments of the present disclosure.

Referring to FIG. 9, an LED driving circuit 20 may include a switching control circuit 300 of a different type from that of the above-described LED driving circuit 10.

Specifically, an off-time controller 310 of the switching control circuit 300 may further include an off-time converter 315 between a second control unit 313 and a selection switch 314. Parts similar to those of the above-described embodiment are omitted, and the following description will focus on the differences between them.

The off-time converter 315 may receive the control selection signal SEL_CON and the second control signal CON2 of the second frequency. It may output a converted second control signal CON2_MOD to the selection switch 314. The operation of the off-time converter 315 will be described in more detail with reference to FIGS. 10 to 12.

Figure 10:
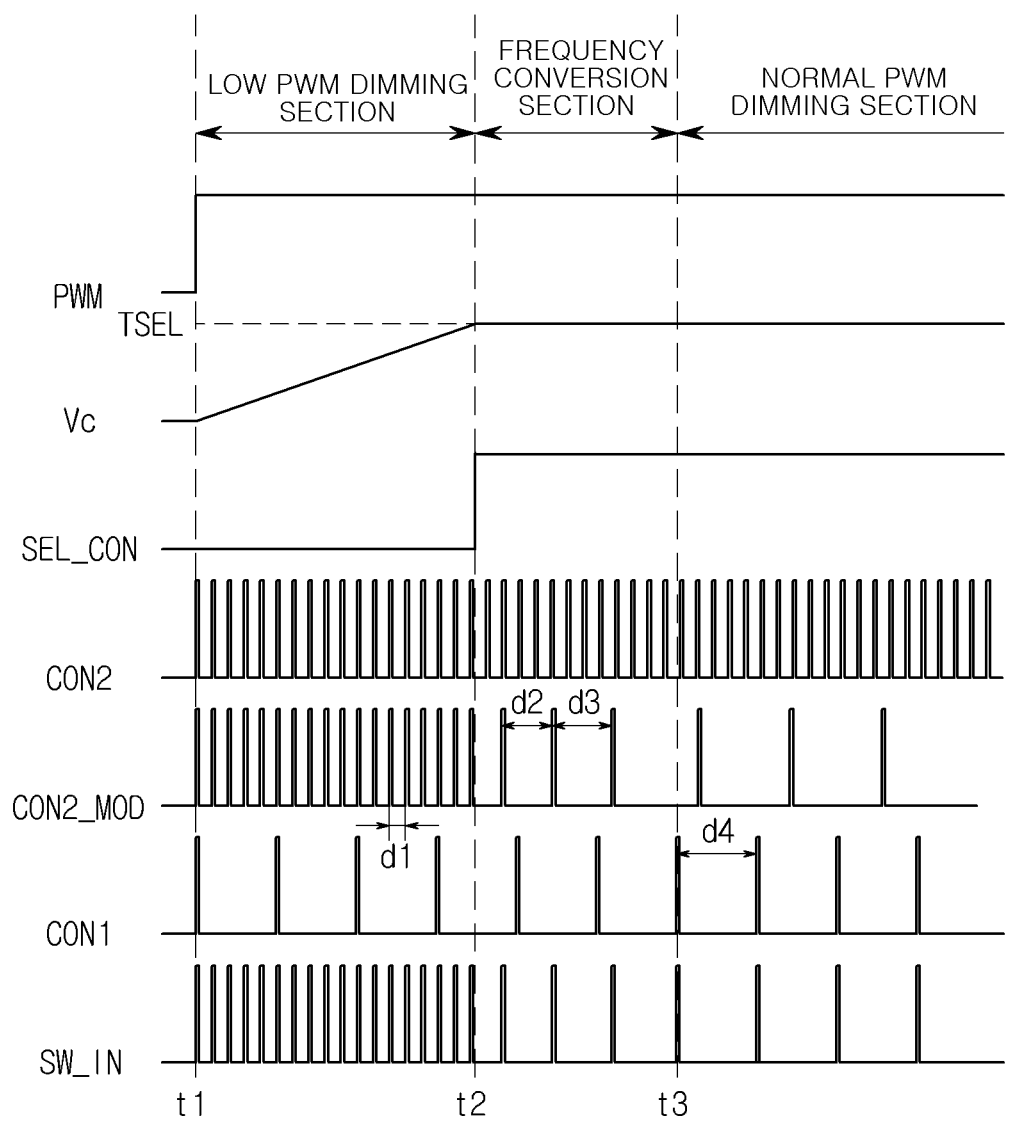
FIGS. 10 to 12 are timing diagrams describing the operation of the LED driving circuit according to one or more other examples of the present disclosure.
Figure 11:
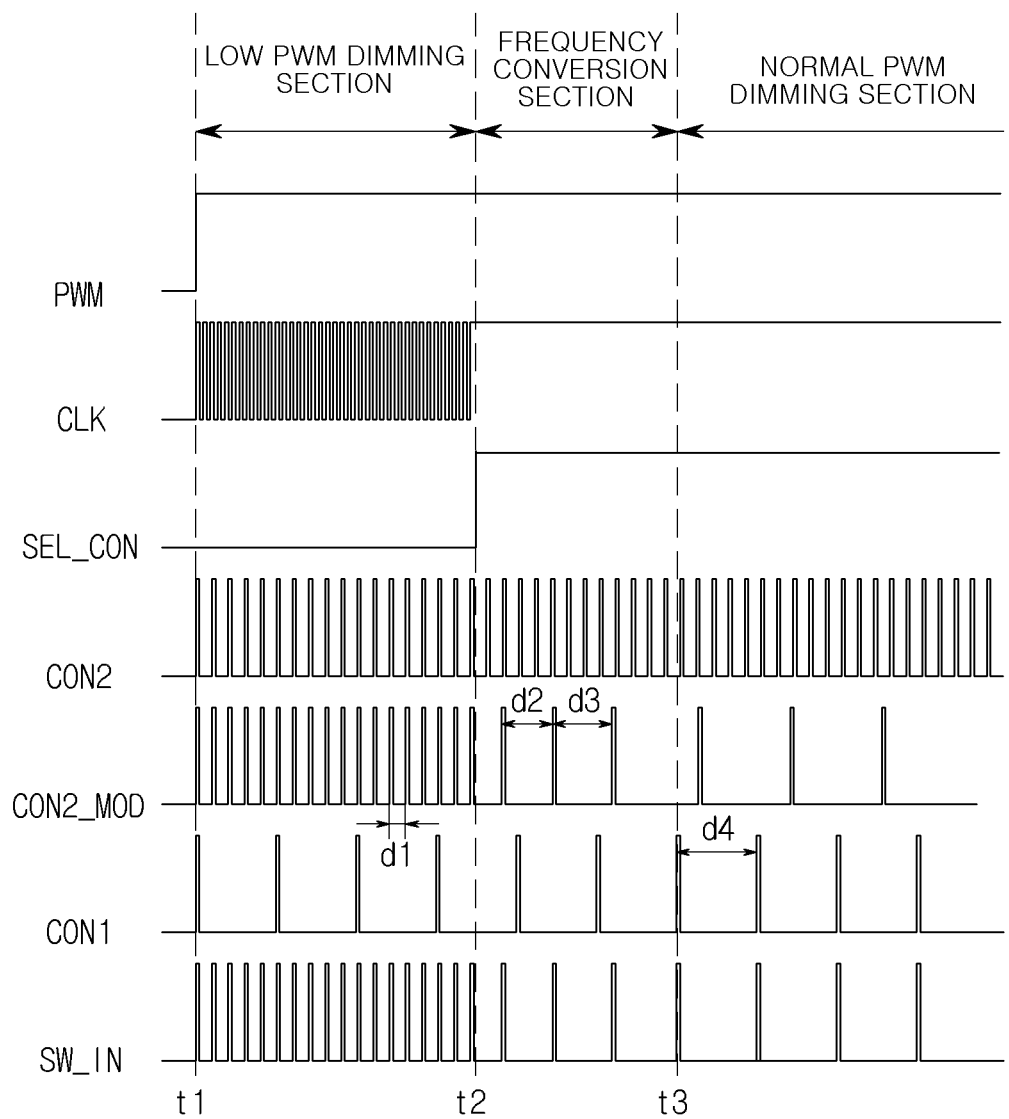
Figure 12:
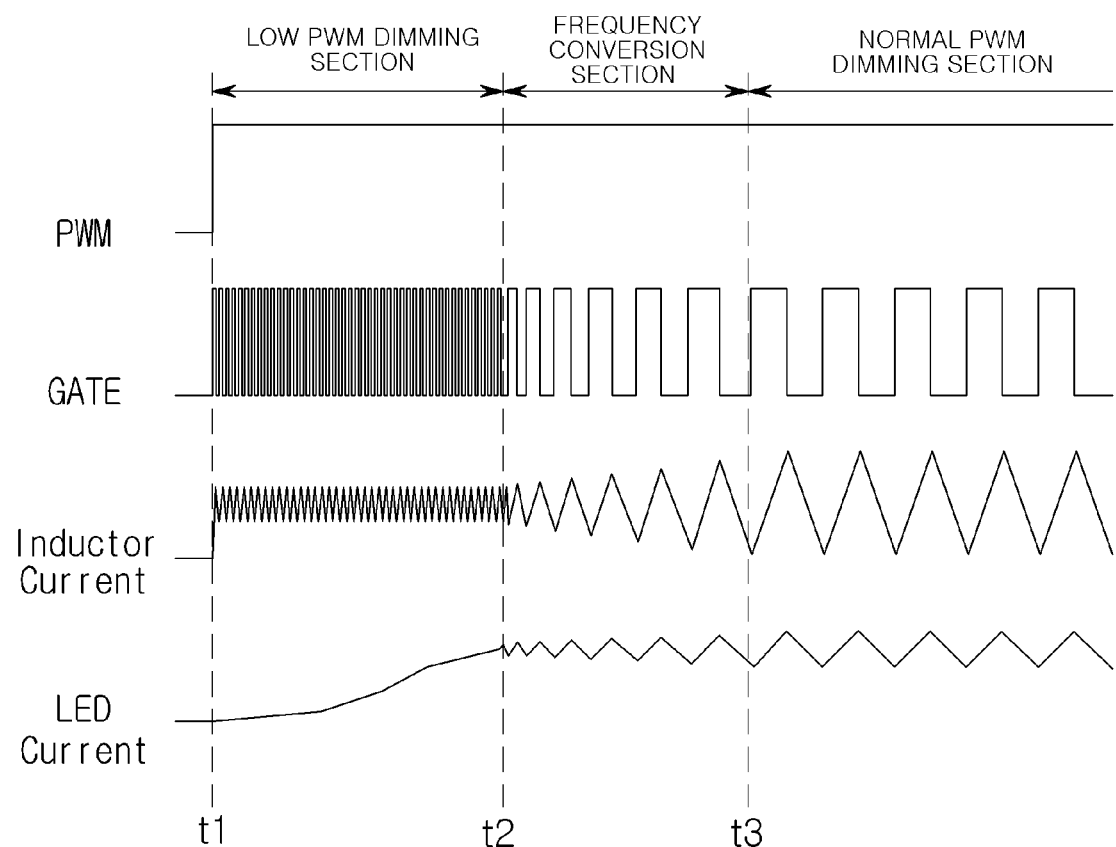

FIGS. 10 to 12 are timing diagrams describing the operation of the LED driving circuit 20 according to one or more other embodiments of the present disclosure.

FIG. 10 describes the operation of the off-time controller 310 when an off-time setting unit 311 has the same structure as that of the embodiment described with reference to FIGS. 4 and 5. The off-time controller 310 outputs a comparison result of the capacitor voltage Vc charged in the capacitor therewithin and the timing selection signal TSEL as the control selection signal SEL_CON.

Also, FIG. 11 describes the operation of the off-time controller 310 when the off-time setting unit 311 has the same structure as that of the embodiment described above with reference to FIGS. 6 and 7. That is, the off-time controller 310 outputs a result of counting the clock signal CLK by the internal counter as the control selection signal SEL_CON.

In a case where the second frequency is sufficiently greater than the first frequency (for example, 1000 times), when the driving switching element 140 that is being switched to the second frequency is controlled to be switched to the first frequency, undershoot or overshoot may occur in the current flowing through the LED module 110 due to the difference in operating frequency.

The off-time setting unit 311 may convert the second control signal CON2 of the second frequency to prevent a sudden change in the operating frequency of the driving switching element 140. It may then output the converted second control signal CON2_MOD with a third frequency different from the first frequency and the second frequency to the selection switch 314.

Referring to FIGS. 10 and 11, the low PWM dimming section starts at the time point t1, and the capacitor voltage Vc starts charging. The off-time converter 315 provides the second control signal CON2 of the second frequency provided from the second control unit 313 to the selection switch 314 without converting it. Therefore, a period d1 of the converted second control signal CON2_MOD is the same as the period of the second control signal CON2.

When the capacitor voltage Vc is charged as much as the timing selection signal TSEL at the time point t2, the high-level control selection signal SEL_CON is output. The high-level control selection signal SEL_CON is provided to the off-time converter 315. The off-time converter 315 receives the high-level control selection signal SEL_CON, converts the frequency of the second control signal CON2 to the third frequency, and generates the converted second control signal CON2_MOD. The period d2 of the converted second control signal CON2_MOD may be greater than the period d1 of the second control signal CON2 and less than the period d4 of the first control signal CON1.

In one or more embodiments of the present disclosure, the off-time converter 315 may generate the converted second control signal CON2_MOD by converting the second control signal CON2 such that the period of the second control signal CON2 increases as time passes. In this case, the converted second control signal CON2_MOD may be generated such that the period d3 of the next pulse increases more than the period d2 of the previous pulse.

In one or more embodiments of the present disclosure, the selection switch 314 may further include a comparator (not shown). The comparator may compare the period of the converted second control signal CON2_MOD with the period d4 of the first control signal CON1. When the period of the converted second control signal CON2_MOD is greater than or equal to the period d4 of the first control signal CON1, the comparator may output a switching change signal. In accordance with the switching change signal, the selection switch 314 may select the first control signal CON1 having the first frequency and may output to a switch driving unit 320. Accordingly, the normal PWM dimming section may start at a time point t3.

The comparator may compare the frequencies of the control signals and output the switching change signal. According to the present disclosure's embodiment, the comparator may output the switching change signal when the frequency of the converted second control signal CON2_MOD is equal to or less than the frequency of the first control signal CON1. Accordingly, the selection switch 314 may select the first control signal CON1 having the first frequency in accordance with the switching change signal. The normal PWM dimming section may start at the time point t3.

Referring to FIG. 12, the LED driving circuit 20 starts to operate in the low PWM dimming section at the time point t1 and starts to operate in a frequency conversion section at the time point t2. In the low PWM dimming section, the gate signal GATE having the second frequency is provided to the driving switching element 140. In the frequency conversion section, the gate signal GATE having the third frequency less than the second frequency is provided to the driving switching element 140. At the time point t3, the LED driving circuit 20 provides the gate signal GATE having the first frequency less than the third frequency to the driving switching element 140.

That is, the LED driving circuit 20 includes the frequency conversion section between the low PWM dimming section and the normal PWM dimming section, and drives the driving switching element 140 by using the gate signal GATE having the third frequency greater than the first frequency and less than the second frequency in the frequency conversion section. Accordingly, it is possible to prevent that undershoot or overshoot occurs in the current flowing through the LED module 110 due to a sudden frequency change between the low PWM dimming section and the normal PWM dimming section.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A switching control circuit configured to turn on a driving switching element by providing a gate signal to the driving switching element connected in series to an LED, the switching control circuit comprising:
the switching control circuit configured to divide a PWM dimming signal into a normal PWM dimming section and a low PWM dimming section based on a timing selection signal, provide the gate signal of a first frequency to the driving switching element in the normal PWM dimming section, and provide the gate signal of a second frequency, greater than the first frequency, in the low PWM dimming section.

2. The switching control circuit of claim 1, further comprising:
an off-time controller configured to receive the timing selection signal, determine a length of the low PWM dimming section in accordance with a voltage level of the timing selection signal, select and output a control signal of the second frequency during the low PWM dimming section, and select and output a control signal of the first frequency in the normal PWM dimming section; and
a switch driving unit configured to generate the gate signal from the selected result.

3. The switching control circuit of claim 2, wherein the off-time controller comprises:
an off-time setting unit configured to compare a capacitor voltage, charged by a start of the low PWM dimming section, with the voltage level of the timing selection signal, and output a control selection signal; and
a selection switch configured to select and output any one of the control signal of the first frequency and the control signal of the second frequency in accordance with the control selection signal.

4. The switching control circuit of claim 3,
wherein the off-time setting unit is further configured to output the control selection signal with a low level when the capacitor voltage is less than the voltage level of the timing selection signal, and output the control selection signal with a high level when the capacitor voltage is higher than the voltage level of the timing selection signal, and
wherein the selection switch is further configured to output the control signal of the second frequency by the control selection signal with a low level, or output the control signal of the first frequency by the control selection signal with a high level.

5. The switching control circuit of claim 2, wherein the off-time controller comprises:
an off-time setting unit configured to compare a result value obtained by counting clocks in the low PWM dimming section with the voltage level of the timing selection signal, and output a control selection signal; and
a selection switch configured to select and output any one of the control signal of the first frequency and the control signal of the second frequency in accordance with the control selection signal.

6. The switching control circuit of claim 5,
wherein the off-time setting unit is further configured to output the control selection signal with a low level when the result value obtained by counting clocks is less than the voltage level of the timing selection signal, and output the control selection signal with a high level when the result value obtained by counting clocks is greater than the voltage level of the timing selection signal, and
wherein the selection switch is further configured to output the control signal of the second frequency by the control selection signal with a low level, and output the control signal of the first frequency by the control selection signal with a high level.

7. The switching control circuit of claim 2, wherein the off-time controller comprises:
an off-time converter configured to receive the control signal of the second frequency in a frequency conversion section between the low PWM dimming section and the normal PWM dimming section, and output a control signal of a third frequency greater than the first frequency and less than the second frequency; and a selection switch configured to select and output the control signal of the third frequency in the frequency conversion section.

8. The switching control circuit of claim 7, wherein the off-time converter is further configured to output the control signal of the third frequency such that the third frequency is decreased over time in the frequency conversion section.

9. The switching control circuit of claim 8, wherein the selection switch further comprises a comparator configured to output a switching change signal when the third frequency is equal to or less than the first frequency, and wherein the selection switch is further configured to select and output the control signal of the first frequency in accordance with the switching change signal.

10. The switching control circuit of claim 2, further comprising a comparison unit configured to compare a source terminal voltage of the driving switching element with a reference voltage, wherein the switch driving unit is composed of an SR latch.

11. An LED driving circuit, comprising:

a buck converter configured to include a driving switching element connected in series to an LED module; and a switching control circuit configured to provide a gate signal to the driving switching element, divide a PWM dimming signal into a normal PWM dimming section and a low PWM dimming section based on a timing selection signal, provide the gate signal of a first frequency to the driving switching element in the normal PWM dimming section, and provide the gate signal of a second frequency greater than the first frequency in the low PWM dimming section.

12. The LED driving circuit of claim 11, wherein the buck converter further comprises:

a capacitor connected in parallel to the LED module;
an inductor connected in series to the LED module;
a diode configured to supply energy released from the inductor to the LED module; and
a source resistor configured to sense a source terminal voltage of the driving switching element.

13. The LED driving circuit of claim 11, further comprising:

an off-time controller configured to receive the timing selection signal, determine a length of the low PWM dimming section in accordance with a voltage level of the timing selection signal, select and output a control signal of the second frequency during the low PWM dimming section, and select and output a control signal of the first frequency in the normal PWM dimming section; and a switch driving unit configured to generate the gate signal from the selected result.

14. The LED driving circuit of claim 13, wherein the off-time controller comprises:

an off-time setting unit configured to compare a capacitor voltage, charged by a start of the low PWM dimming section, with the voltage level of the timing selection signal, and output a control selection signal; and a selection switch configured to select and output any one of the control signal of the first frequency and the control signal of the second frequency in accordance with the control selection signal.

15. The LED driving circuit of claim 14, wherein the off-time setting unit is further configured to output the control selection signal with a low level when the capacitor voltage is less than the voltage level of the timing selection signal, and output the control selection signal with a high level when the capacitor voltage is higher than the voltage level of the timing selection signal, and wherein the selection switch is further configured to output the control signal of the second frequency by the control selection signal with a low level, and output the control signal of the first frequency by the control selection signal with a high level.

16. The LED driving circuit of claim 13, wherein the off-time controller comprises:

an off-time setting unit configured to compare a result value obtained by counting clocks in the low PWM dimming section with the voltage level of the timing selection signal, and output a control selection signal; and a selection switch configured to select and output any one of the control signal of the first frequency and the control signal of the second frequency in accordance with the control selection signal.

17. The LED driving circuit of claim 16, wherein the off-time setting unit is further configured to output the control selection signal with a low level when the result value obtained by counting clocks is less than the voltage level of the timing selection signal, and output the control selection signal with a high level when the result value obtained by counting clocks is greater than the voltage level of the timing selection signal, and wherein the selection switch is further configured to output the control signal of the second frequency by the control selection signal with a low level, and output the control signal of the first frequency by the control selection signal with a high level.

18. The LED driving circuit of claim 13, wherein the off-time controller comprises:

an off-time converter configured to receive the control signal of the second frequency in a frequency conversion section between the low PWM dimming section and the normal PWM dimming section, and output a control signal of a third frequency greater than the first frequency and less than the second frequency; and a selection switch configured to select and output the control signal of the third frequency in the frequency conversion section.

19. The LED driving circuit of claim 18, wherein the off-time converter is further configured to output the control signal of the third frequency such that the third frequency is decreased over time in the frequency conversion section.

20. The LED driving circuit of claim 19, wherein the selection switch further comprises a comparator configured to output a switching change signal when the third frequency is equal to or less than the first frequency, and wherein the selection switch is further configured to select and output the control signal of the first frequency in accordance with the switching change signal.

21. A switching control circuit, comprising:

an off-time controller configured to receive a timing selection signal, determine a length of a low PWM dimming section of a PWM dimming signal in accordance with a voltage level of the timing selection signal, select and output a control signal of a first frequency in a normal PWM dimming section of the PWM dimming signal, and select and output a control signal of a second frequency, greater than the first frequency, during the low PWM dimming section; and a switch driving unit configured to generate a gate signal from the selected result to a driving switching element connected in series to an LED.

22. The switching control circuit of claim 21, wherein the off-time controller comprises:

an off-time setting unit configured to compare a capacitor voltage, charged by a start of the low PWM dimming section, with the voltage level of the timing selection signal, and output a control selection signal; and a selection switch configured to select and output any one of the control signal of the first frequency and the control signal of the second frequency in accordance with the control selection signal.

23. The switching control circuit of claim 22, wherein the off-time setting unit is further configured to output the control selection signal with a low level when the capacitor voltage is less than the voltage level of the timing selection signal, and output the control selection signal with a high level when the capacitor voltage is higher than the voltage level of the timing selection signal, and wherein the selection switch is further configured to output the control signal of the second frequency by the control selection signal with a low level, or output the control signal of the first frequency by the control selection signal with a high level.

24. The switching control circuit of claim 21, wherein the off-time controller comprises:

an off-time setting unit configured to compare a result value obtained by counting clocks in the low PWM dimming section with the voltage level of the timing selection signal, and output a control selection signal; and a selection switch configured to select and output any one of the control signal of the first frequency and the control signal of the second frequency in accordance with the control selection signal.

* * * * *